UNITED STATES PATENT OFFICE.

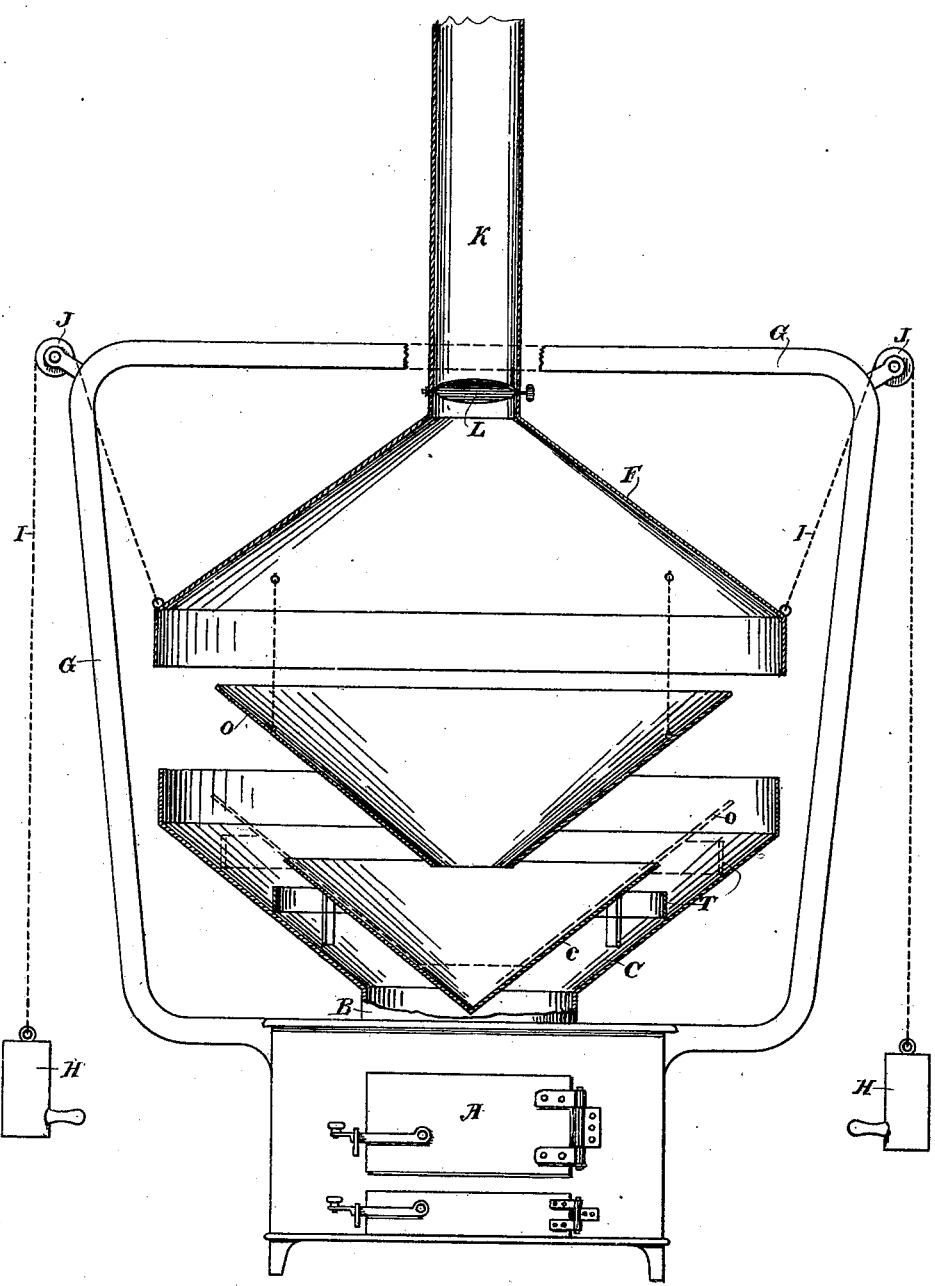

ELLSWORTH BEESON, OF FRESNO, CALIFORNIA.

TIRE-HEATER.

SPECIFICATION forming part of Letters Patent No. 646,567, dated April 3, 1900.

Application filed September 7, 1899. Serial No. 729,672. (No model.)

*To all whom it may concern:*

Be it known that I, ELLSWORTH BEESON, a citizen of the United States, residing at Fresno, county of Fresno, State of California, have invented an Improvement in Tire-Heaters; and I hereby declare the following to be a full, clear, and exact description of the same.

My invention relates to a device which is especially designed for heating tires previous to setting them upon the rim or felly of a vehicle.

It consists of the parts and the constructions and combinations of parts hereinafter described and claimed.

Ths figure is a vertical section through the apparatus.

The object of my invention is to provide a means for heating tires with the smallest waste of heat or fuel and such a construction that any available form of fuel may be used for the purpose.

The device is also so arranged that without change it may be employed for any-sized tire which is likely to be used.

A represents the furnace of any suitable description. From the upper part of this furnace a flue B extends and at the top opens into a divergent cone-shaped shell C of sufficient diameter to receive any tire which it may be desired to heat, and the tire which is shown at T is placed in this shell with its periphery resting upon the inclined bottom surface thereof. Interior to this and suitably supported with relation to it is an inner and smaller cone c, which is suitably supported so as to leave a space between itself and the shell. The apex of the inner cone stands just above the flue B, and heat arising through this flue will be diverged by the inner cone and discharged around the periphery thereof and against the tire which is supported in the line with the heat passing through the apparatus. A framework or yoke G serves to support an upper or cap cone F by means of pulleys J, suitably fixed thereon, and cords or chains I, passing over said pulleys, have counterweights H at their outer ends. The inner ends are suitably connected by eyes or other devices with the periphery of the cap-cone F, which is thus suspended by the chains and balanced by the counterweights. By moving this cone downwardly its flange at the lower outer edge fits over a corresponding flange upon the upper edge of the shell C, thus making a tight inclosure. From the center of this upper cone F an escape-flue K extends upwardly, and within this flue is fitted a damper L, which may be opened or closed to any desired extent to retain the heat within the chamber thus formed. In this manner a very small amount of fuel will produce a sufficient heat to raise the temperature of the tire as much as may be desired, and when the tire has thus been heated it can be removed by simply raising the upper cone F sufficiently for the purpose.

It will be seen that by reason of the divergent bottom of the shell C any tire within its diameter may be laid therein and will rest upon some point of this bottom, while the directing-cone c will cause the heat to strike the tire at whatever point it may be located.

The interior directing-cone may be of any suitable size within the size of the smallest tire, so that the latter will pass over it when placed in the apparatus, and in order to confine the heat and direct it upon tires of larger diameter I have shown a cone O similar to the cone c and having approximately the same divergence outwardly and upwardly. This cone is of considerably larger diameter than the cone c and is suspended by chains from the upper cone F, so as to be lifted with said cone when the tire is to be placed in or removed from the apparatus. After the tire has thus been placed, the apparatus being closed by lowering the cone F, the cone O will fit into the cone c; but being of larger diameter its periphery will project outwardly beyond the tire which is resting upon the cone F, thus forming a guide to direct the heat and keep it from rising until after it has passed over the tire and produced its proper effect. The heat will then pass around the periphery of the cone O and thence to the escape-flue K.

Having thus described my invention, what I claim as new, and desire to secure by Letters Patent, is—

1. A device for heating tires consisting of a shell having an outwardly and upwardly divergent conical inner surface, upon which the tire may be laid, a furnace for producing heat, a flue connecting the furnace with the apex of the shell and means for directing the heat outwardly along the floor of the shell and over the tire.

2. An apparatus for heating tires consisting of a shell having a conical inner surface divergent upwardly and outwardly from its apex and adapted to support the tire, a furnace for producing heat, a flue connecting said furnace with the apex of the shell, and a cone of smaller diameter and similar form supported within and above the bottom of the shell and acting to divert the heat outwardly and over the tire contained in the shell.

3. An apparatus for heating tires consisting of a shell having a conical inner surface divergent outwardly and upwardly from its apex and serving to support the tire upon the interior of its bottom, a furnace and connecting-flue whereby heat is directed into the apex of the cone, a cone of similar shape supported above the bottom of the shell and acting to divert the heat outwardly and over the tire and a hood by which the shell may be closed from above.

4. An apparatus for heating tires consisting of a shell having a conical inner surface divergent outwardly and upwardly adapted to support a tire within it, a furnace and connecting-flue by which heat is transmitted to the interior of the shell, an interior cone of similar shape supported above the bottom of the shell acting to divert the heat outwardly over the tire, a second cone convergent upwardly having a central escape-flue, and suspending-chains and counterweights whereby it may be lowered to close the shell or raised to allow for the insertion and removal of the tires.

5. In an apparatus for heating tires a shell having an outwardly and upwardly divergent conical surface and a peripheral flange, a furnace and a flue by which heat is transmitted therefrom to the apex of the shell, a flanged cone similar to the shell, but having its apex upwardly directed, counterbalance-weights and suspending-chains whereby the cone will be lowered so that the flanges of the shell and cone fit together, and a cone suspended within the upper movable cone having approximately the same shape as the shell, said cone being lowered with the upper covering-cone and supported so that it directs the heat over the tires.

6. In a tire-heating apparatus, a shell having an upwardly and outwardly divergent conical inner surface and a peripheral flange and adapted to support the tire upon the bottom, a furnace and a flue by which heat is transmitted therefrom to the apex of the shell, a cap-cone having a similar flange adapted to fit over and close the periphery of the shell, suspending-chains and counterweights by which the cap-cone may be raised or depressed, and a central escape-flue leading from the cap-cone and provided with a controlling-damper, a plurality of cones corresponding in shape with the shell, one of said cones supported so as to divert the heat outwardly within the shell and the other flexibly suspended from the upper cone so as to be raised and lowered with it to rest upon the interior lower cone and to extend the heat-flue outwardly when in position.

In witness whereof I have hereunto set my hand.

ELLSWORTH BEESON.

Witnesses:
 H. F. G. HOPKINS,
 J. P. SOLOMON.